US006981582B2

(12) United States Patent
Miller et al.

(10) Patent No.: US 6,981,582 B2
(45) Date of Patent: Jan. 3, 2006

(54) SYSTEMS AND METHODS FOR COMPACT ARRANGEMENT OF FOODSTUFF IN A CONVEYANCE SYSTEM

(76) Inventors: R. Craig Miller, 15160 Desman Rd., La Mirada, CA (US) 90638; Benny F. DiGerlando, 667 Co R.D. 189, Cedar Bluff, AL (US) 35959

( * ) Notice: Subject to any disclaimer, the term of this patent is extended or adjusted under 35 U.S.C. 154(b) by 0 days.

(21) Appl. No.: 10/659,635

(22) Filed: Sep. 9, 2003

(65) Prior Publication Data
US 2005/0061162 A1  Mar. 24, 2005

(51) Int. Cl.
*B65G 47/26* (2006.01)
(52) U.S. Cl. ............... 198/456; 198/437; 198/419.2; 99/404; 99/443 C
(58) Field of Classification Search ............ 198/434, 198/456, 436, 437, 419.2; 99/404, 443 C
See application file for complete search history.

(56) References Cited

U.S. PATENT DOCUMENTS

| 2,380,910 | A | * | 7/1945 | Newton ................. 198/434 |
| 3,314,554 | A | * | 4/1967 | Cuniberti ............... 198/434 |
| 3,724,639 | A | * | 4/1973 | Hara .................... 198/434 |
| 3,915,282 | A | * | 10/1975 | Remensperger ........... 198/456 |
| RE30,096 | E | | 9/1979 | Richards |
| 4,360,098 | A | * | 11/1982 | Nordstrom .............. 198/419.2 |
| 5,560,952 | A | | 10/1996 | Miller et al. |
| 5,786,566 | A | | 7/1998 | Miller et al. |
| 5,821,503 | A | | 10/1998 | Witt |
| 6,157,014 | A | * | 12/2000 | Goranson ............... 99/443 C |
| 6,539,934 | B2 | | 4/2003 | Moshonas et al. |
| 6,691,857 | B2 | * | 2/2004 | Sanchez de Leon Rodriguez ..... 198/434 |
| 2003/0042248 | A1 | | 3/2003 | Witt et al. |
| 2003/0066734 | A1 | | 4/2003 | Prentice et al. |
| 2003/0068418 | A1 | | 4/2003 | Bell et al. |

* cited by examiner

*Primary Examiner*—Joe Dillon, Jr.
(74) *Attorney, Agent, or Firm*—Ganz Law, P.C.

(57) ABSTRACT

A system for arranging foodstuff in compact formations is presented. The system contemplates a lateral conveyance apparatus having a transport surface, such as a moving conveyor belt, that is adapted to receive foodstuff from an upstream food presenting machine and selectively shifts foodstuff laterally so that adjacent rows may be arranged in a compact, nested arrangement. The lateral conveyance apparatus has a lateral shift mechanism and an optional sensing device for activating the mechanism as a row of items of foodstuff is sensed. The system may also include an axial spacing apparatus having a transport surface for varying the axial spacing of rows of foodstuff. Axial spacing is achieved by creating a speed differential between the transport surface of the axial spacing apparatus and the transport surface of another, adjacent apparatus.

6 Claims, 20 Drawing Sheets

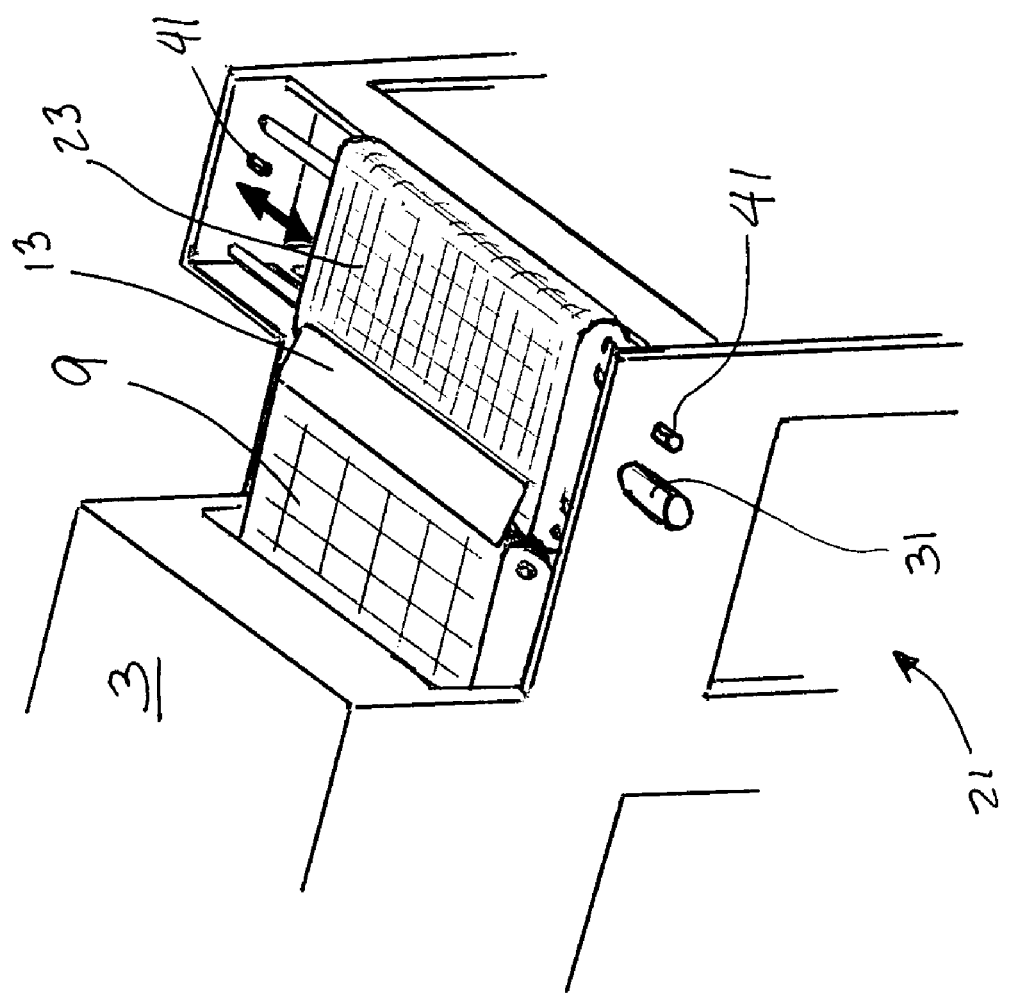

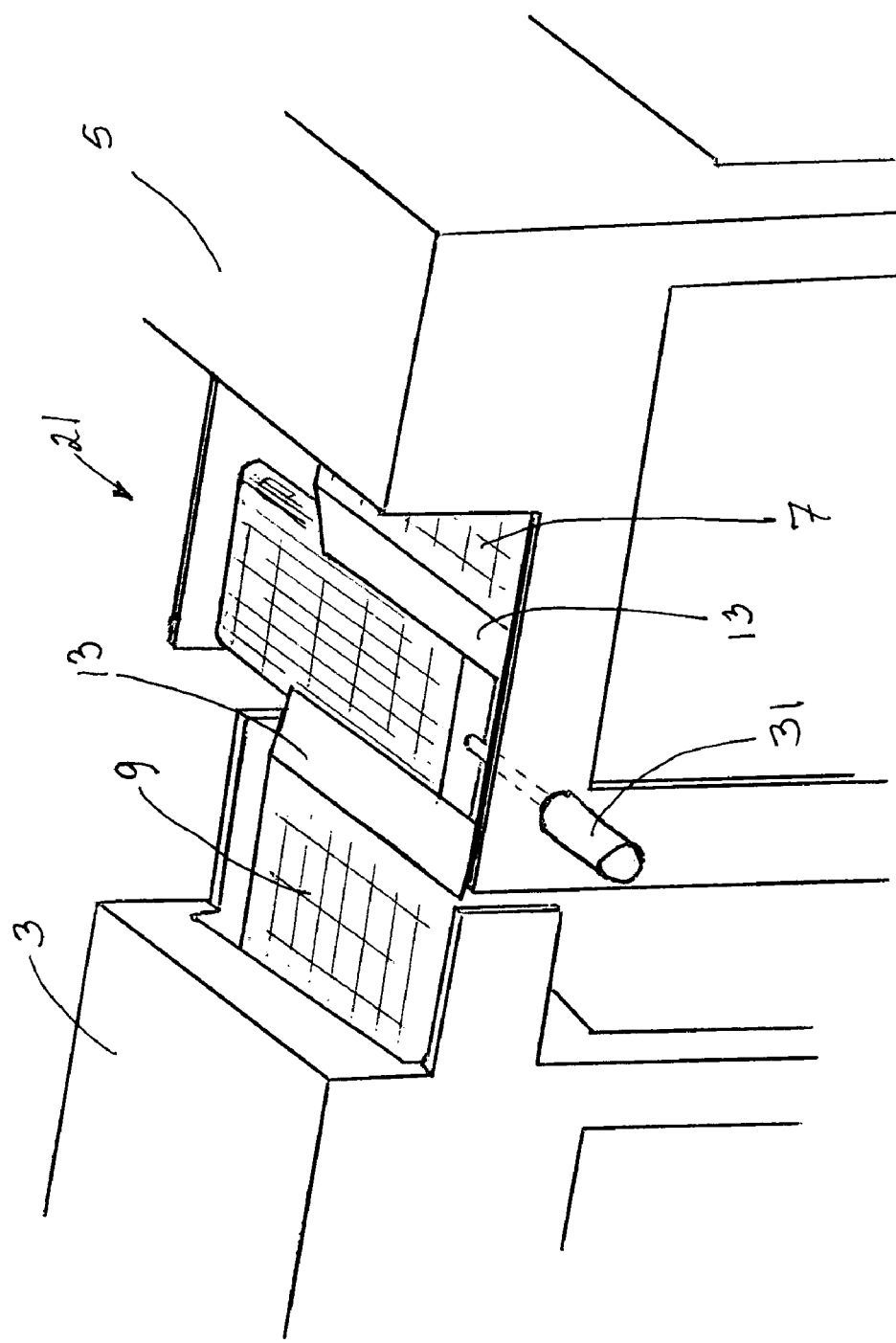

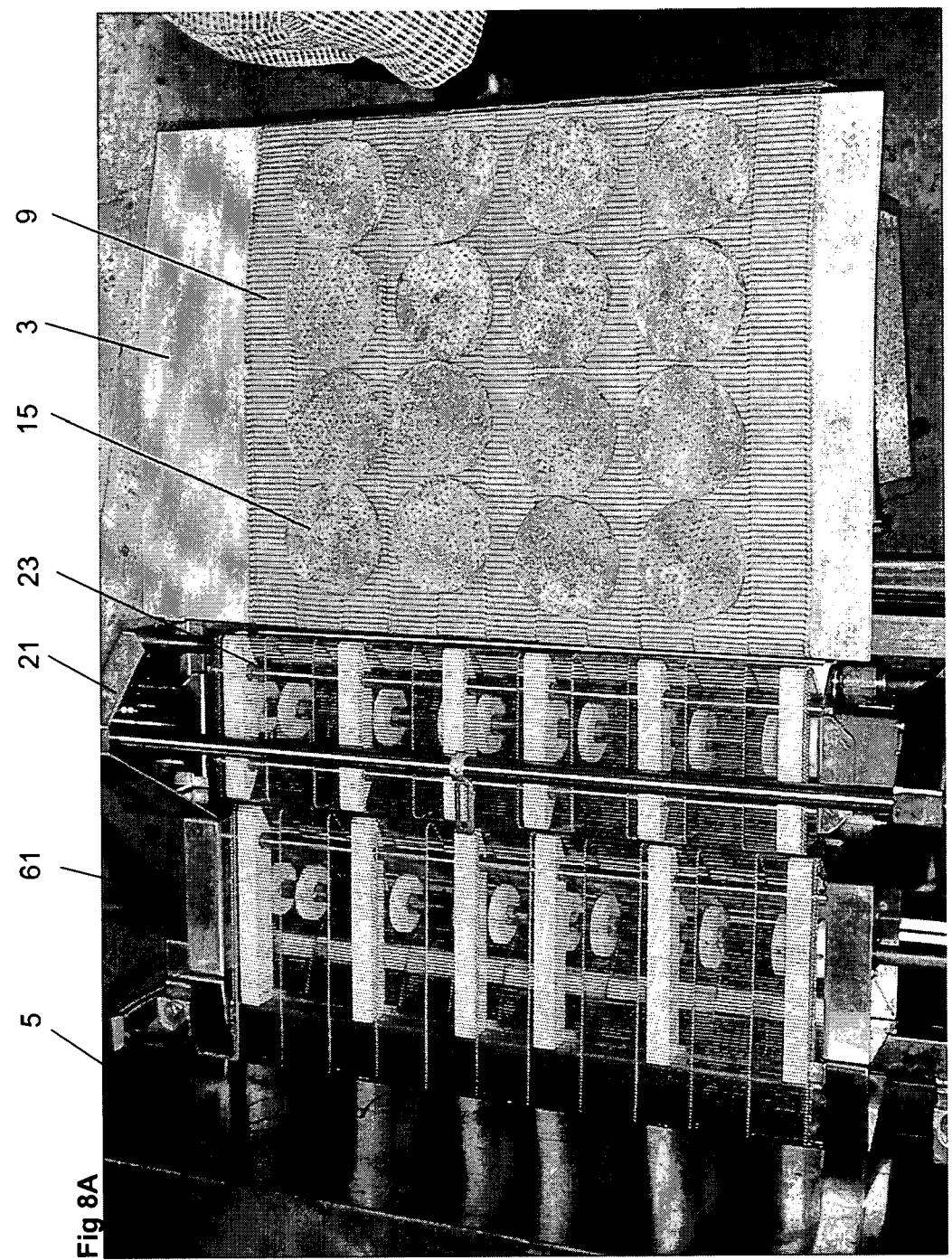

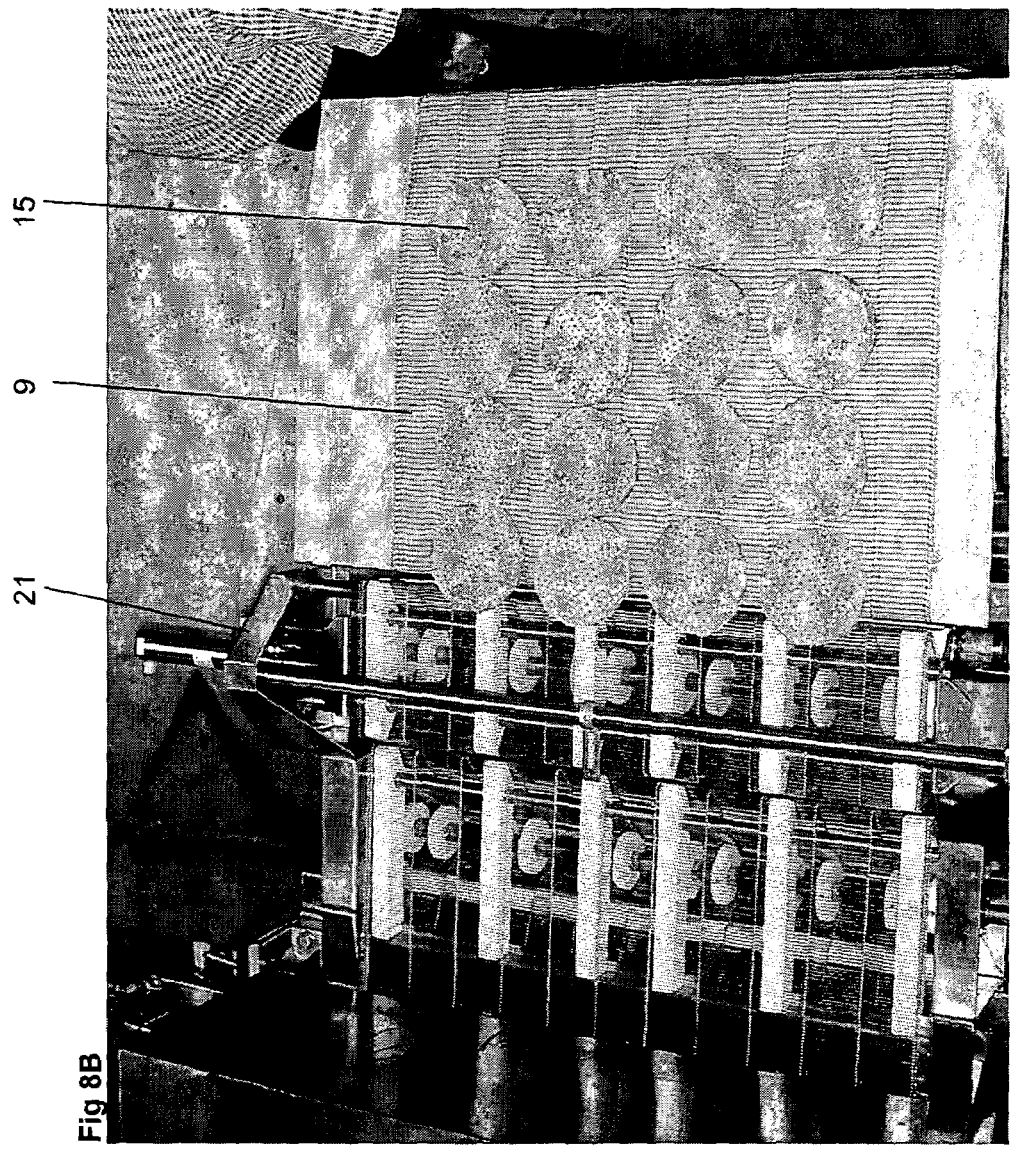

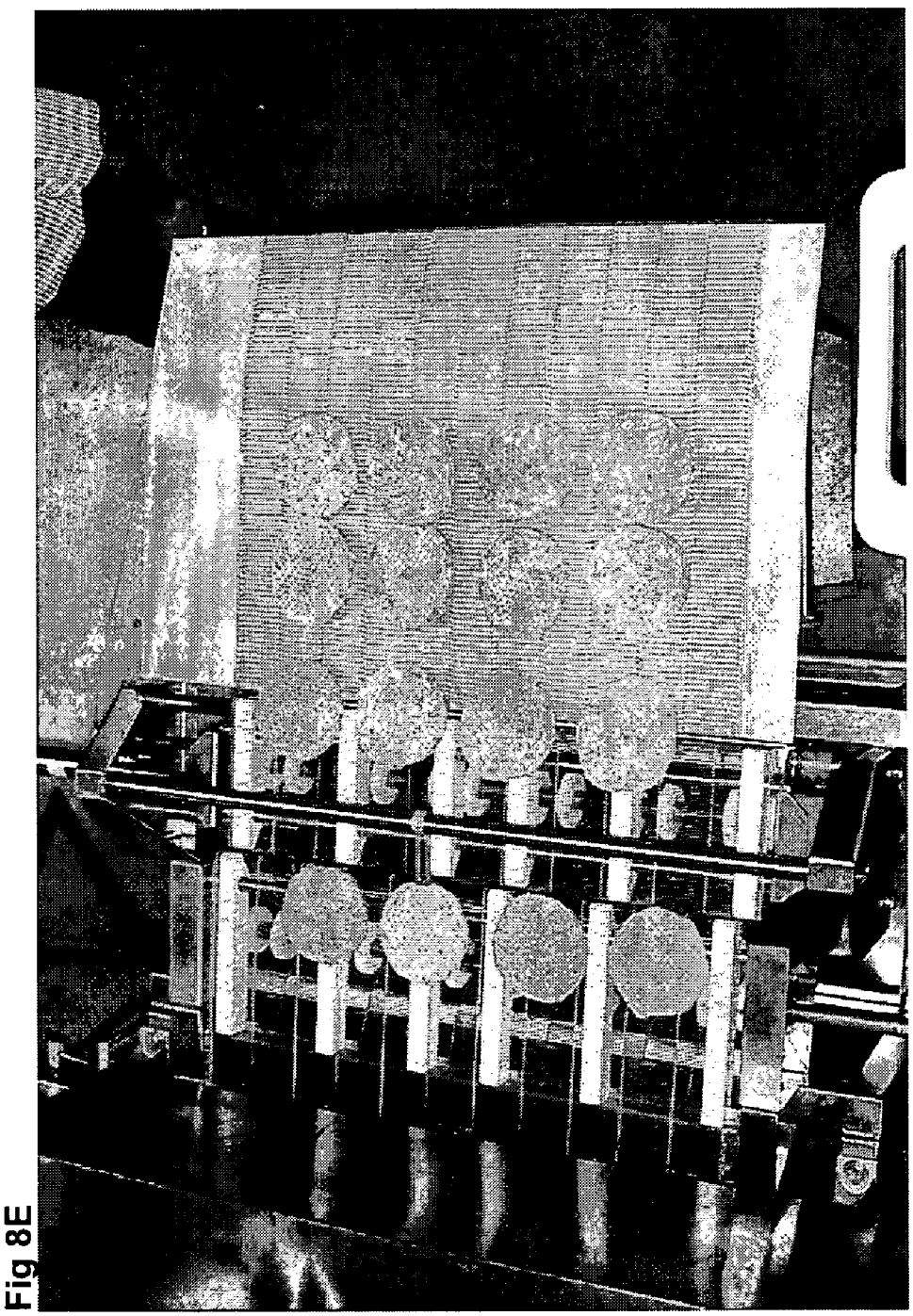

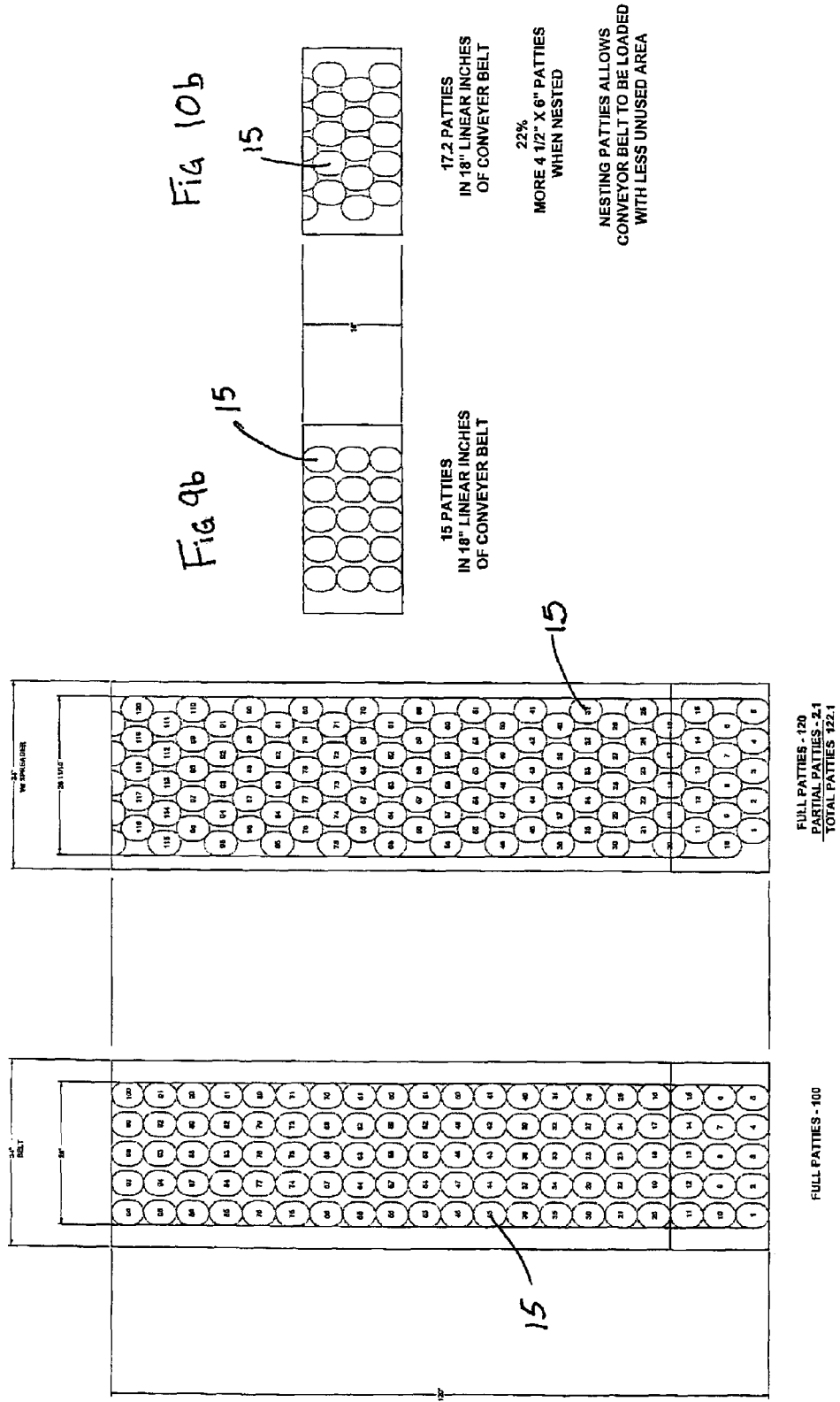

SYSTEMS AND METHODS FOR COMPACT ARRANGEMENT OF FOODSTUFF IN A CONVEYANCE SYSTEM

BACKGROUND OF THE INVENTION

This invention relates to a system for arranging items on a conveyor. More specifically, this invention relates to the compact arrangement of foodstuff on a conveyor so improved throughput efficiencies may be appreciated in subsequent processes.

There is an ever present need to arrange the placement of foodstuff on a conveyor so that improved packing and transferring efficiencies can be achieved.

Most attempts to adjust the position of foodstuff on a conveyor have been limited to adjusting the speed of various conveyors in a system of conveyors or using rails or cleats to arrange items on a conveyor. For example, one attempt to improve conveyors for arranging foodstuff is disclosed in U.S. Pat. App. No. 20030068418. Therein, to adjust the position of snack chips on a conveyor, a control system adjusts one or more of the speeds of a transfer belt, phasing belt, cleats and/or discharge belt. Sensors are situated above the transfer belt, phasing belt, alignment belt and discharge belt to communicate position of the snack chips to a control device.

An attempt to improve conveyors for the arrangement and handling of different sized items is disclosed in U.S. Pat. App. 20030066734. Therein, four rails are used to create lanes for the items to travel. By using four drive shafts, each with its own motor, in cooperation with the rails, varying size items can be accommodated on the conveyor.

The prior art, however, does not address the need for a more compact arrangement of foodstuff on a conveyor for use in subsequent processing. In view of this problem, there is a need for a device that can arrange foodstuff in compact patterns for subsequent operations. In particular, there is a need for higher throughput per a given processing device, such as a conveyor oven.

SUMMARY OF THE INVENTION

The present invention overcomes problems in the prior art by providing a system that more optimally arranges foodstuff on a conveyor. For example, upstream devices may arrange foodstuff in rows, albeit with a significant amount of space between each foodstuff. Thus, it may be desired to minimize the amount of space between items for greater throughput of items. The present invention reduces the amount of space required for a given quantity of foodstuff, and therefore increases of the throughput of the foodstuff in subsequent conveyor operations. In a preferred embodiment, the present invention provides a compact, nested arrangement of adjacent rows of foodstuff.

In one possible embodiment the present invention contemplates a system for the adjustable placement of foodstuff. The system includes a lateral conveyance apparatus which has a first transport surface, such as a moving conveyor, and a lateral shift mechanism linked to the transport surface for laterally shifting the first transport surface. The system has a second transport surface adjacent to the first transport surface for either transferring items of foodstuff to the first transport surface or receiving items of foodstuff from the first transport surface. The system, through the lateral shift mechanism, enables offset arrangement of foodstuff on a transport surface downstream of the lateral conveyance apparatus, which leads to more compact arrangements.

In another possible embodiment, the present invention contemplates a system for adjustable placement of foodstuff. The system includes a set of transport surfaces, which are adapted so that foodstuff is received on a downstream member of a pair of transport surfaces in the set in an axially more compact arrangement than transferred from an adjacent upstream transport surface. The system also includes a pair of transport surfaces adapted so that foodstuff is received on a downstream member of a pair of transport surfaces in the set in a laterally shifted arrangement relative to the arrangement carried on an adjacent upstream transport surface. Further, the system is capable of delivering rows of foodstuff to a downstream food processing apparatus in a nested arrangement.

In another possible embodiment the present invention contemplates a system for adjustable placement of foodstuff that includes a transport surface including a continuous loop conveyor for transporting the foodstuff. The system also includes a contact sensor that senses an item of foodstuff on the transport surface and generates a signal. The system further includes a lateral shift mechanism in communication with the sensor so that the signal causes the adjusting mechanism to laterally adjust the transport surface.

In another possible embodiment the present invention contemplates a system for the adjustable placement of foodstuff including an upstream apparatus for presenting a first set of foodstuff, a transport surface that receives foodstuff from the upstream apparatus, a lateral shift mechanism mechanically linked to the transport surface for selectively laterally adjusting the transport surface within a predetermined range so that a second set of foodstuff being presented by the first apparatus is offset therefrom, and a downstream apparatus for processing foodstuff that receives on a transport surface the sets of foodstuff from the lateral adjusting conveyor.

In another possible embodiment the present invention contemplates a system for the adjustable placement of foodstuff including a food presenting machine for presenting a first set of foodstuff and a transport surface that receives foodstuff from the food presenting machine. The system also includes a lateral shift mechanism that selectively laterally displaces the transport surface within a predetermined range so that a second set of foodstuff being presented by the food presenting machine is offset therefrom. In addition, a speed control mechanism can selectively control the rate of movement of items of foodstuff moving on or along the transport surface. Finally, the system includes a food cooking apparatus that receives the sets of foodstuff from the transport surface.

In another possible embodiment the present invention contemplates a system for compact arranging of foodstuff on a transport surface. The system includes an upstream apparatus that presents a first row and a second row of foodstuff, a lateral conveyance apparatus downstream of the upstream apparatus. The lateral conveyance apparatus includes a transport surface and a lateral shift mechanism linked to the transport surface. Further, the lateral conveyance apparatus is disposed to sequentially receive the first and second rows of foodstuff and is able to selectively shift one row laterally relative to the other. The system further includes an apparatus downstream of the lateral conveyance apparatus for receiving the first row of foodstuff and a laterally shifted second row of foodstuff.

In another possible embodiment the present invention contemplates a system for compact arranging of foodstuff on a conveyor that includes an integrated apparatus that presents a first row and a second row of foodstuff. The integrated apparatus includes a lateral shift mechanism for lateral shifting of a first row of foodstuff relative to a second row input to or output from the integrated apparatus. The integrated apparatus also includes a food processing apparatus.

In another possible embodiment the present invention contemplates a method for arranging foodstuff in conveyance system. The method includes the following steps: providing a set of transport surfaces; outputting a first set of foodstuff to a first transport surface; outputting a second set of foodstuff to the first transport surface; outputting the first and second sets of foodstuff to a second transport surface so that the first set is laterally shifted relative to the second set; and advancing the laterally shifted sets of foodstuff to a subsequent food processing operation.

In another possible embodiment the present invention contemplates a method for manufacturing a lateral conveyance apparatus. The method includes the following steps: providing a transport surface; providing a lateral shift mechanism; and assembling the transport surface to the lateral shift mechanism so that the lateral shift mechanism laterally shifts the transport surface within a predetermined range.

The foregoing is not intended to be an exhaustive list of embodiments and features of the present invention. Persons skilled in the art are capable of appreciating other embodiments and features from the following detailed description in conjunction with the drawings.

BRIEF DESCRIPTION OF THE DRAWINGS

FIG. 6 shows a perspective view of another possible embodiment of the present invention.

FIG. 7 shows a perspective view of another possible embodiment of the present invention.

FIG. 8a shows a foodstuff processing system in an initial operation of a sequence of operations, illustrating a preferred embodiment of the present invention.

FIG. 8b shows a foodstuff processing system of FIG. 8a in a subsequent operation of the sequence of operations.

FIG. 8e shows a foodstuff processing system of FIG. 8d in a subsequent operation of the sequence of operations.

FIG. 8i shows a foodstuff processing system of FIG. 8h in a subsequent operation of the sequence of operations.

FIG. 9a shows an arrangement of items of foodstuff on a transport surface.

FIG. 9b shows a detailed portion of the arrangement of FIG. 9a.

FIG. 10a shows a nested arrangement of foodstuff on a transport surface.

FIG. 10b shows a detailed portion of the arrangement of FIG. 10a.

DETAILED DESCRIPTION OF THE INVENTION

Figure 1:
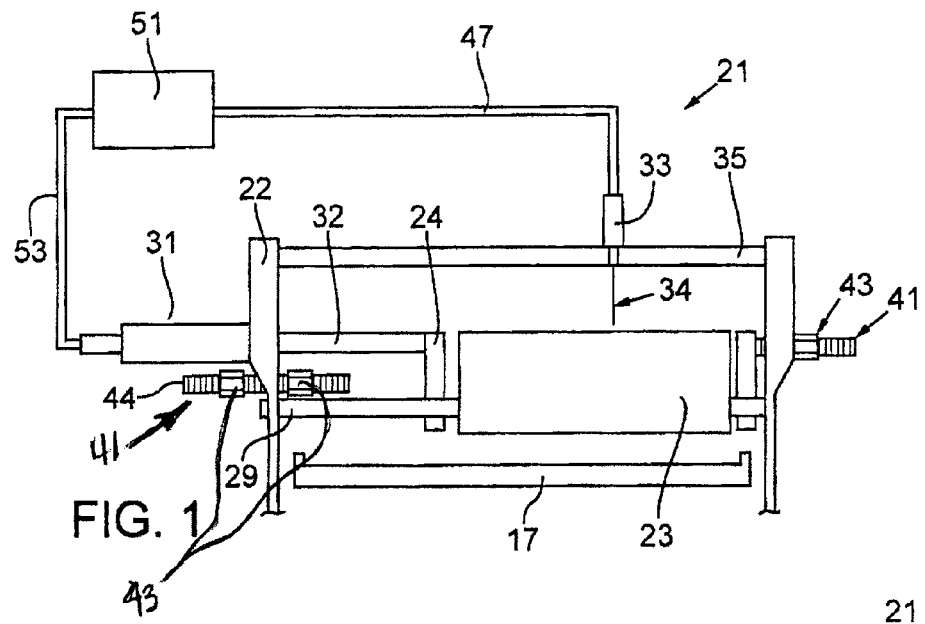
FIG. 1 shows an end view of one system of the present invention.

Representative embodiments of the present invention are shown in FIGS. 1–10, wherein similar features share common reference numerals.

Overview

The present invention provides a system for more compact arrangement of foodstuff on a transport surface associated with the processing of the foodstuff. The preferred compact arrangement arises from a rearrangement of a set of parallel and spaced rows of foodstuff on a first transport surface, such as a conveyor belt, to a "nested" arrangement wherein the items in rows are lateral offset and in contact, as illustrated in arrangement "c" in FIG. 4.

Figure 3:
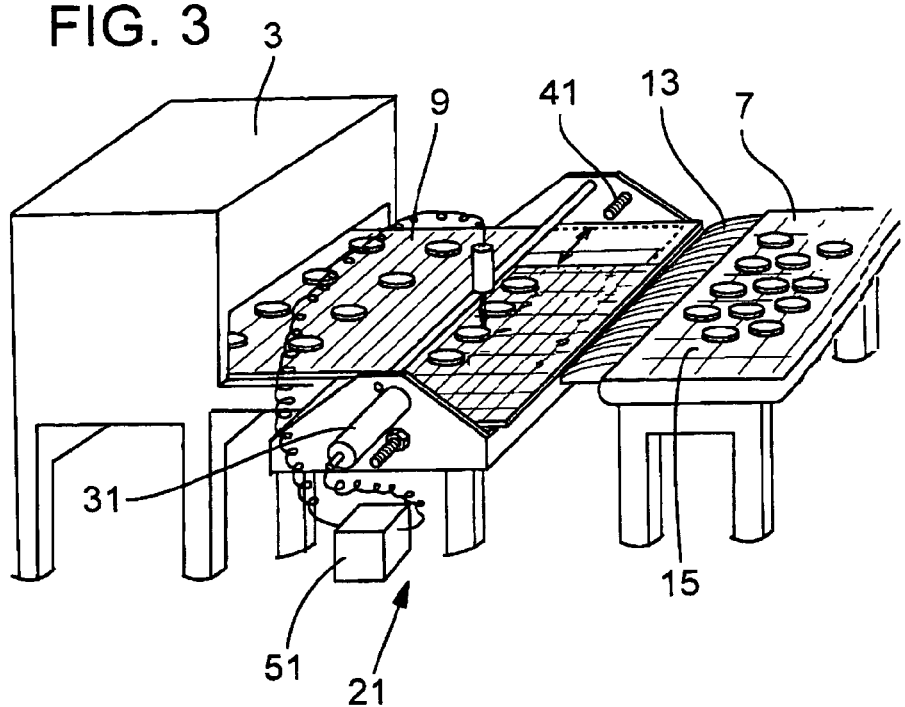
FIG. 3 shows one possible arrangement of the present invention in a food processing system.

In FIG. 3 one possible embodiment of the present invention is shown. Upstream apparatus 3 dispenses or conveys foodstuff 15 for ultimate delivery to downstream apparatus 5, which processes the foodstuff. A lateral conveyance apparatus 21 with a laterally shiftable transport surface may be disposed between upstream apparatus 3 and downstream apparatus 5. An optional axial spacing apparatus 61 may be included adjacent to the lateral conveyance apparatus 21. As illustrated in FIG. 8, the axial spacing apparatus 61 is preferably located downstream and adjacent lateral conveyance apparatus 21. By varying the speed of the transport surface for apparatus 61 relative to adjacent transport surfaces, variable axial spacing of rows of foodstuff may be achieved.

In operation, the lateral conveyance apparatus 21 receives a first arrangement of foodstuff 15 from the upstream apparatus, laterally shifts the foodstuff and presents the shifted arrangement to the transport surface of a downstream apparatus. By alternately shifting the rows received on the transport surface for apparatus 21, and maintaining a lower speed for the transport surface downstream of apparatus 61, the nested arrangement of arrangement "c" in FIG. 4.

Significant throughput gains may occur in a foodstuff processing system that incorporates the present invention. For example, as shown in FIGS. 9a and 9b, a compact arrangement of items of foodstuff in adjacent rows, aligned center-to-center, on a given length of transport surface may include about 100 patties. However, a nested arrangement of foodstuff arranged according to the principles of the present invention, as shown in FIGS. 10a and 10b, would accommodate about 122 patties (optionally, this may include partial patties), which is about a 22% increase in the amount of foodstuff.

Lateral Conveyance Apparatus

Figure 2:
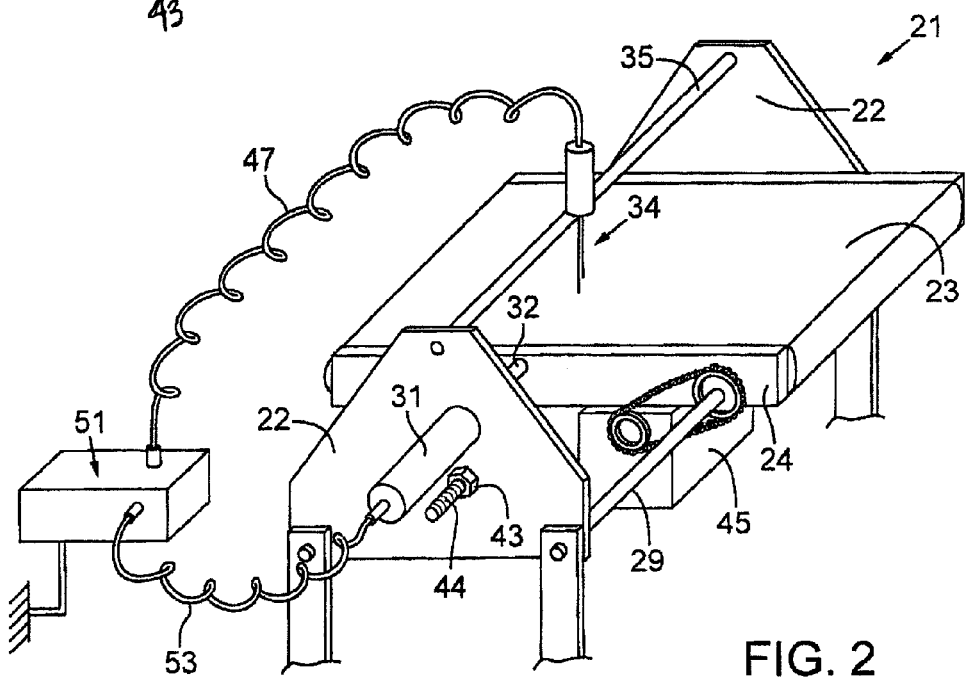
FIG. 2 shows a perspective view of the system of FIG. 1.

FIGS. 1 and 2 depict one possible embodiment of a lateral conveyance apparatus 21 according to the present invention. Lateral conveyance apparatus 21 has a transport surface 23 for linear conveyance of foodstuff 15, and a lateral shift mechanism 31 for shifting the lateral position of foodstuff moving along or on the transport surface. Also shown is a frame 22 for supporting these and other elements. The apparatus may include a stroke adjuster 41 for setting the lateral travel of the transport surface 23 within a selectable range. Another option may be a controller 51, which could relay any signal generated by a sensing device 31 to the lateral shift mechanism 31.

Transport Surface

The transport surface 23 may be a generally planar surface for transporting items of foodstuff. Any means for accepting foodstuff could be used, for example, a mesh continuous loop conveyor, a gravity slide, a chain-roller conveyor, live roller conveyor, cleated loop conveyor, roller surface, or a solid-surface loop conveyor. The transport surface 23 accepts foodstuff from an upstream apparatus and presents the items to a downstream apparatus. One possible transport surface is described in U.S. Pat. No. 5,560,952, which describes an oven system including a conveyor, the entire disclosure of which is hereby incorporated by reference and set forth in its entirety for all purposes.

One possible version of the transport surface 23 is a tight mesh stainless steel conveyor having a mesh spacing of about ⅛ inch between wire supports. As such, the transport surface 23 may include necessary components such as a belt for transporting the foodstuff, a motor assembly 45, and a supporting subframe 24. For example, the subframe 24 may be adapted to support a continuous loop belt so that the motor assembly 45 may selectively control the rate and direction of travel of the belt.

The motor assembly 45 may be a variable speed electric motor and may cause two directions of motion. For example, an electric gear motor, such as, for example, a Sumitomo SM-Hyponic brand gear motor model number RNYMS01-1220YCAV40 available from Los Angeles Rubber Co. and Drive System, Inc., 2915 E. Washington Boulevard, Los Angeles, Calif., 90023, USA is possible for use in various applications contemplated by this invention. Accordingly, the motor assembly 45 may have a shaft drive with sprockets and any assist chain as required, for example. Many other known motor assemblies would work equally well without departing from the spirit of this invention.

Figure 5:
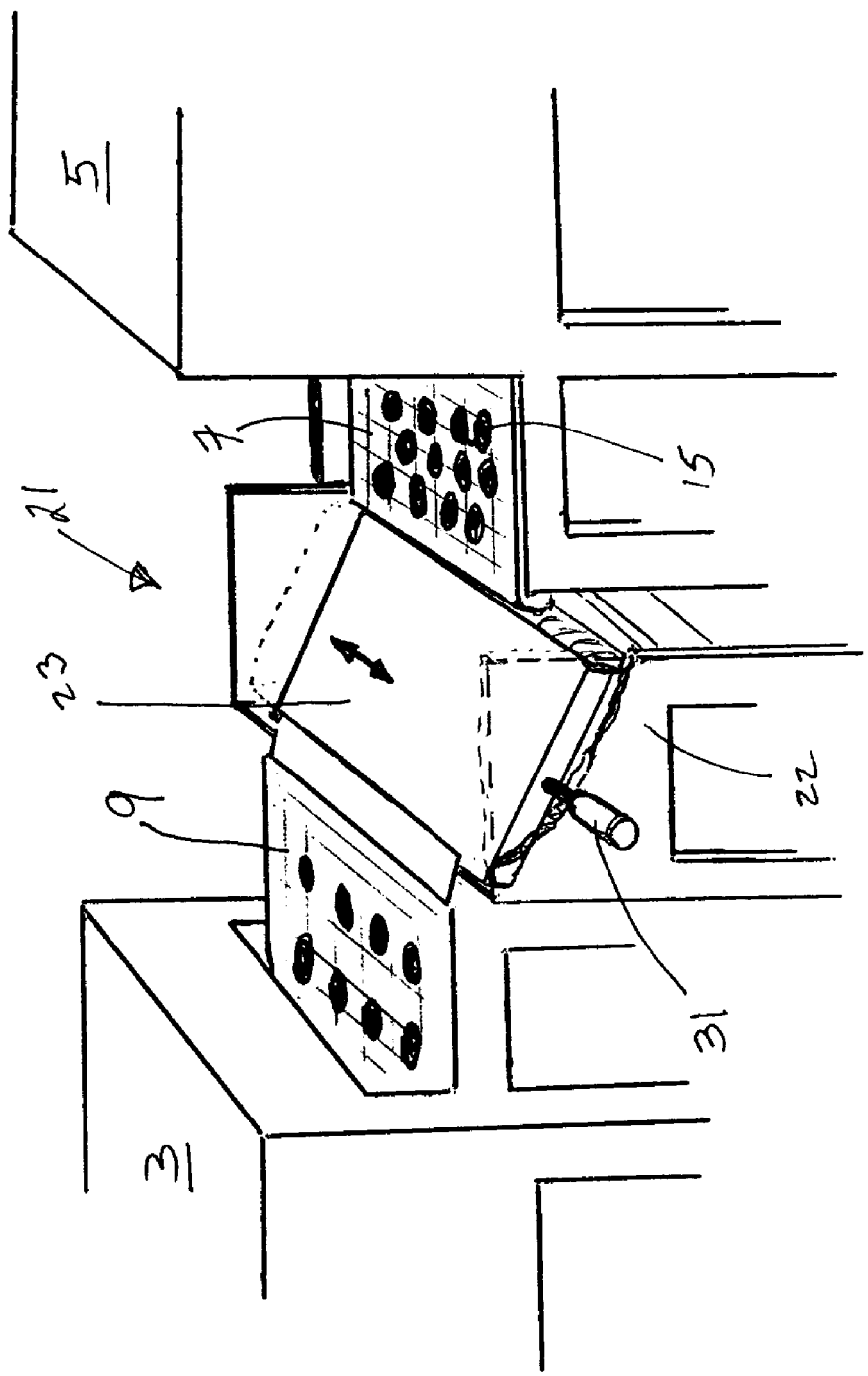
FIG. 5 shows a perspective view of an alternative embodiment in a food processing system of the present invention.

Another possible embodiment of the apparatus 21 is shown in FIG. 5. Accordingly, the transport surface 23 may be a gravity slide. The gravity slide may have a lateral shift mechanism 31 mounted at one end directly to the slide, and at a second end the mechanism may be mounted to the frame 22. Additionally, the gravity slide may have an adjustable incline so that the transfer speed of foodstuff may be selectively adjusted.

The foregoing description of transport surface 23 applies to other transport surfaces for moving foodstuff, including transport surface 63 for axial spacing apparatus 61, described below.

Lateral Shift Mechanism

Lateral shift mechanism 31 selectively positions the transport surface 23. For example, the mechanism 31 could be a rack and pinion gear, worm gear, or any number of cylinder-piston assemblies, such as hydraulic, electric, or pneumatic cylinder assemblies. Also, the mechanism 31 may displace the transport surface 23 within a pre-defined range of travel. The lateral shift mechanism 31 may be attached to the transport surface 23 or otherwise linked mechanically to it. Optionally, the mechanism 31 may be attached or otherwise linked mechanically to a subframe 24, which supports the transport surface 23.

One suitable lateral shift mechanism 31 is a cylinder-piston assembly having a cylinder body mounted to a stationary frame 22. The cylinder may be a pneumatic cylinder having a 1½ inch bore and a 4 inch stroke, for example, an Aurora brand cylinder model number 15SS11C32E8CC, available from Numatic Engineering, 7915 Ajay Drive, Sun Valley, Calif., 91352, USA. However, various pneumatic or hydraulic cylinders, or other mechanisms would work equally well.

The cylinder assembly 31 may have a piston that is connected at one end to the cylinder body, and at a second end to the transport surface 23. Optionally, the second end of the piston may be connected to a subframe 24, as shown in the figures. The piston slidably engages the cylinder body. The motion of the piston is directed to provide lateral shifting, along a lateral axis, generally perpendicular to the direction of travel of foodstuff between an upstream apparatus and a downstream apparatus for food processing. For example, in FIG. 1 the reference direction of the transport surface is in and out of the figure sheet, and the lateral axis would then be left to right.

Operation of the cylinder assembly 31 would cause the piston to reciprocate within a range of motion along the lateral axis. This motion would be transferred to the transport surface 23 or optional subframe 24.

Actuation of the lateral shift mechanism 31, such as the illustrated cylinder assembly, may be selectively controlled. For example, the cylinder assembly could be operated manually, or automatically. In an automatic mode, the cylinder assembly may receive a signal from a controller or other device when a given condition is met, for example, a certain amount of time passing, or the sensing of a particular condition. Other modifications to the lateral shift mechanism 31 are discussed further herein.

Sensing Device

Optionally, a sensing device 33 may be positioned to detect the presence of foodstuff on the transport surface 23. For example, the sensing device 33 may be disposed on a support bar 35 on the frame 22. The device 33 could emit a signal when foodstuff passed within a defined proximity of the sensing device 33. The signal could be directed via a communication element 47 to an intermediate controller 51, or may be routed directly to an actuator for the lateral shift mechanism 31.

The communication element 47 could be an electrical conduit, a wire, a pressurized gas conduit, a hydraulic line, a light emitting diode sensor assembly, a laser, a wireless transmitter, or a fiber optic cable, electro-optical device, for example. The signal could be any combination of air pulses (change in air pressure), electric signals, light pulses, hydraulic pressure change, radio waves, infrared light, and the like, for example. A contemplated communication element 47 is a pressurized gas conduit that sends an air pulse from the sensing device 33 directly to an actuator for the lateral shift mechanism 31.

One contemplated sensing device 33 is a contact sensor comprising a trigger mechanism including a stylus 34. The stylus 34 may be disposed to contact foodstuff on the transport surface 23. Alternatively, the stylus 34 could be a proximity sensor that detects foodstuff as it passes within a defined operating range. In either case, when the device 33 detects foodstuff, a signal may be sent to actuate the lateral shift mechanism 31. Alternatively, this signal could be directed to a controller 51, which could further integrate and distribute the signal as required.

Controller

The present invention contemplates incorporation of an optional controller element 51. In one embodiment the controller may be a signal sent from a sensing device 33 directly to the lateral shift mechanism 31 and/or the axial spacing apparatus 61. In another embodiment, the controller 51 may include a device that receives data input in the form of a signal, internally processes the data and provides an output.

The controller 51 may process input such as, the time of operation or day, speed of the motor, direction of travel, and any signals sent from sensing devices, for example. The controller 51 may apply a programmed logic sequence, such as a computer program. Then, in accordance with predetermined conditions, the controller 51 may cause a subsequent event by sending a signal to another device.

In one example, a sensing device 33 may detect foodstuff and send a signal to the controller 51. The controller would then send an appropriate signal to the lateral shift mechanism 31 so that the transport surface 23 may be adjusted along a lateral axis.

Another option could be that the controller 51 is a human operator that processes information and actuates necessary devices to operate any necessary mechanisms, such as the shifting mechanism 31.

Frame

The present invention contemplates a supporting structure such as a frame 22. The frame 22 may be disposed to arrange various components such as the transport surface 23 and any optional devices, such as the sensing device 33, lateral shift mechanism 31 and sensor support 35.

In addition, the frame 22 may be adapted to support a stroke adjuster 41. The stroke adjuster 41 may be used to limit the travel of the transport surface 23 within the range of motion in a lateral plane. One suitable stroke adjuster 41 may include a threaded rod with a locking element 43.

Optionally, the frame 22 may include a debris pan 17 for collection of any fallout from the foodstuff as it is manipulated by the apparatus 21. Additionally, an optional mounting bar 35 may be positioned on the frame so to present the sensing device 31 in relation to the transport surface 23. The frame 22 may include a support bar 29, arranged on the frame to allow rotation of a conveyor. Additionally, a portion of the frame 22 may be stationary, and be adapted to receive fasteners for connecting the frame to other machines or to the floor, for example.

Axial Spacing Apparatus

An axial spacing apparatus 61, which includes transport surface 63, may be combined in a system that includes lateral conveyance apparatus 21. Preferably, the apparatus 61 includes a variable speed motor or other motive means for adjusting the speed at which items of foodstuff travel on or along transport surface 63.

The axial spacing apparatus 61 sets the spacing of foodstuff on a transport surface relative to an axis defined by the line that foodstuff travels on associated transport surfaces. In FIG. 3, an axial spacing apparatus 61 may be situated adjacent to the lateral conveyance apparatus 21. For example, it may be disposed between the upstream apparatus 3 and the lateral conveyance apparatus 21, as shown in FIG. 3

Figure 4:
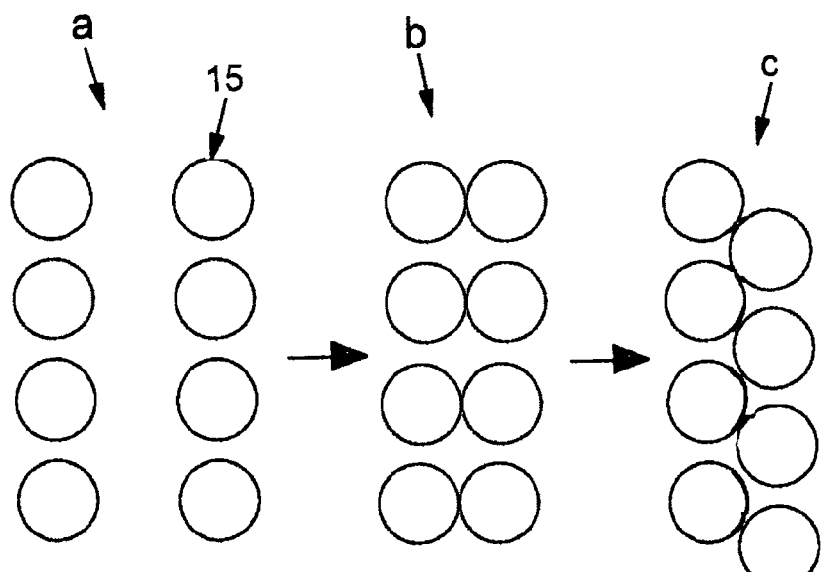
FIG. 4 shows possible arrangement of foodstuff as may be provided in the present invention.
Figure 8C:
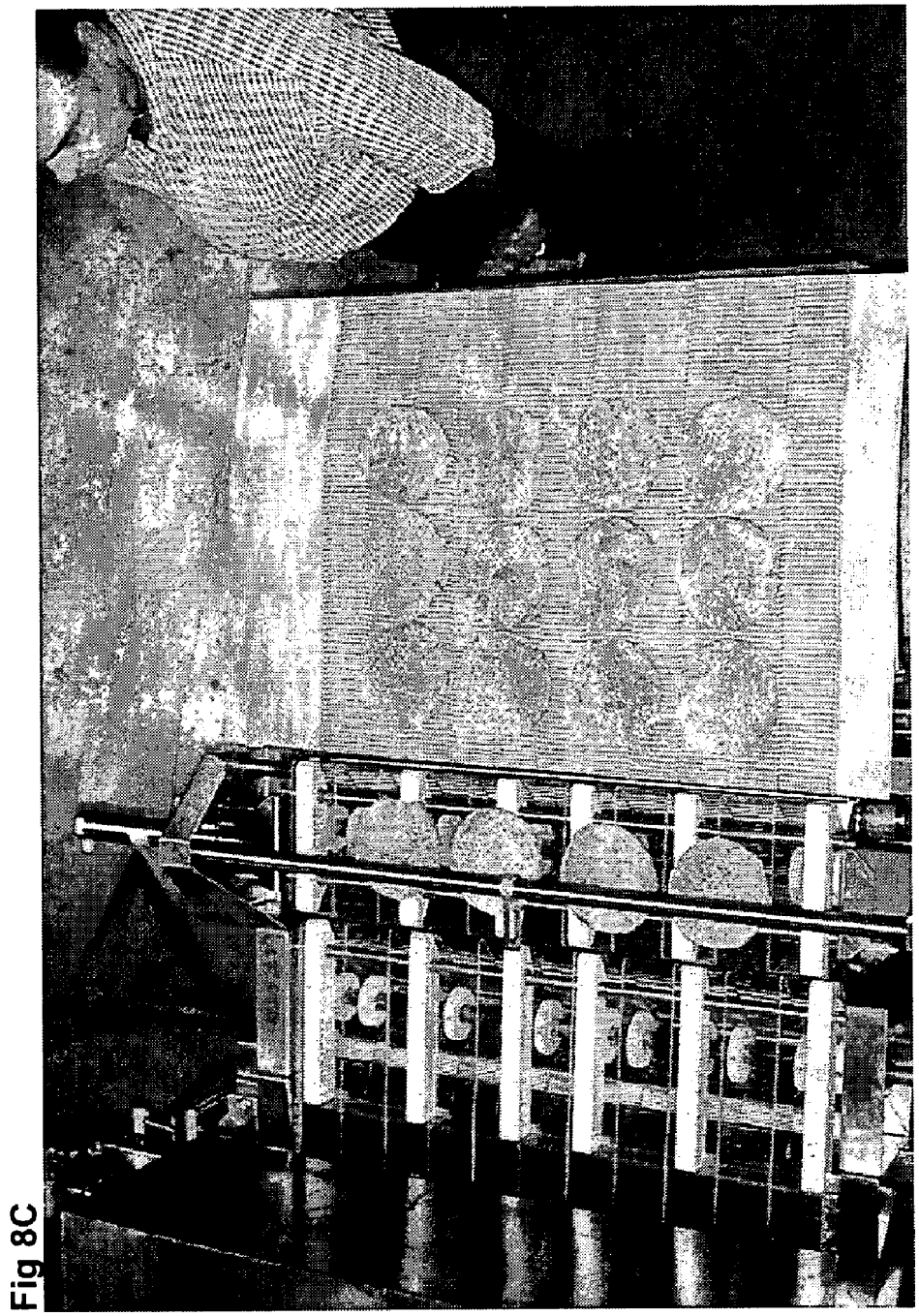
FIG. 8c shows a foodstuff processing system of FIG. 8b in a subsequent operation of the sequence of operations.
Figure 8D:
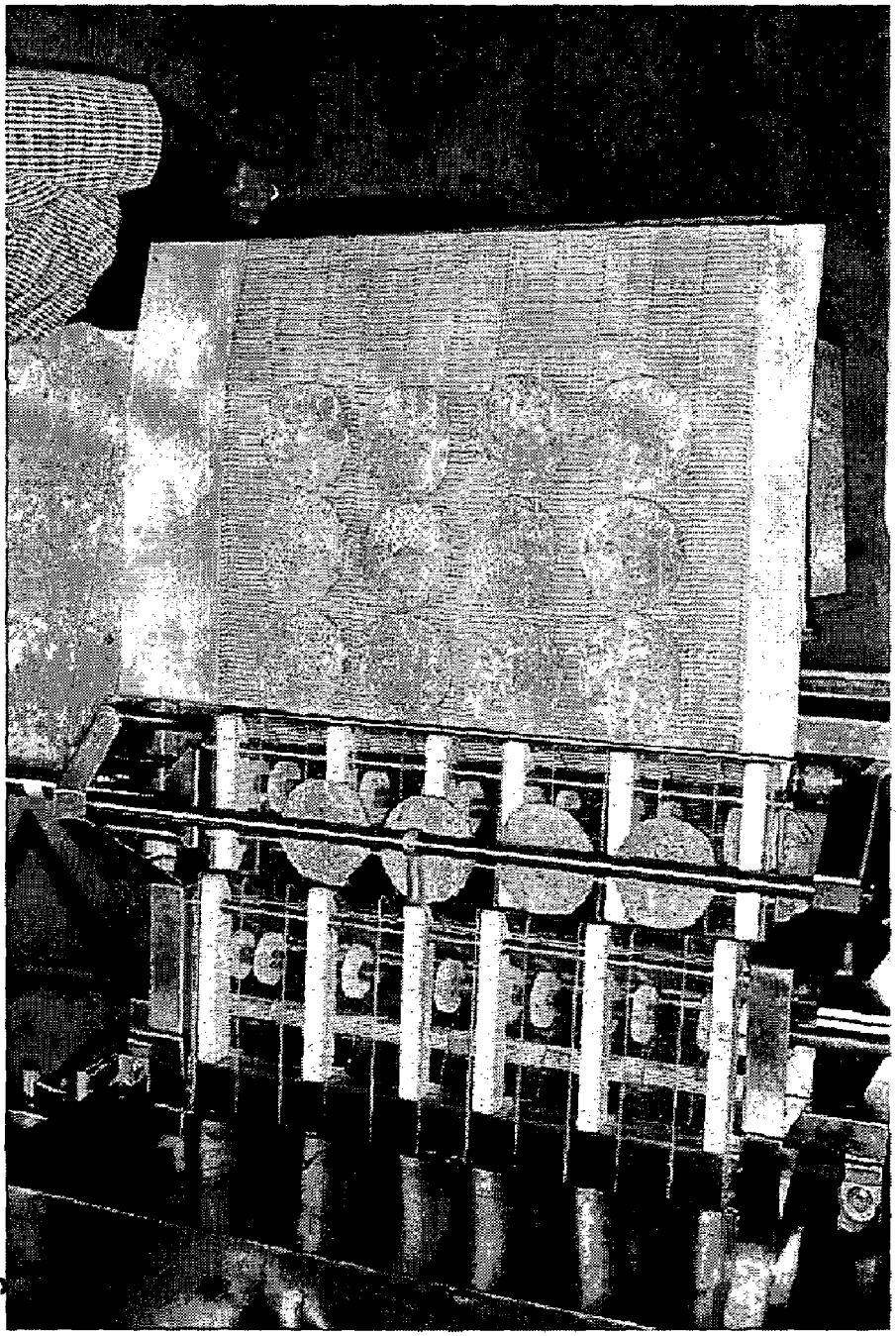
FIG. 8d shows a foodstuff processing system of FIG. 8c in a subsequent operation of the sequence of operations.
Figure 8F:
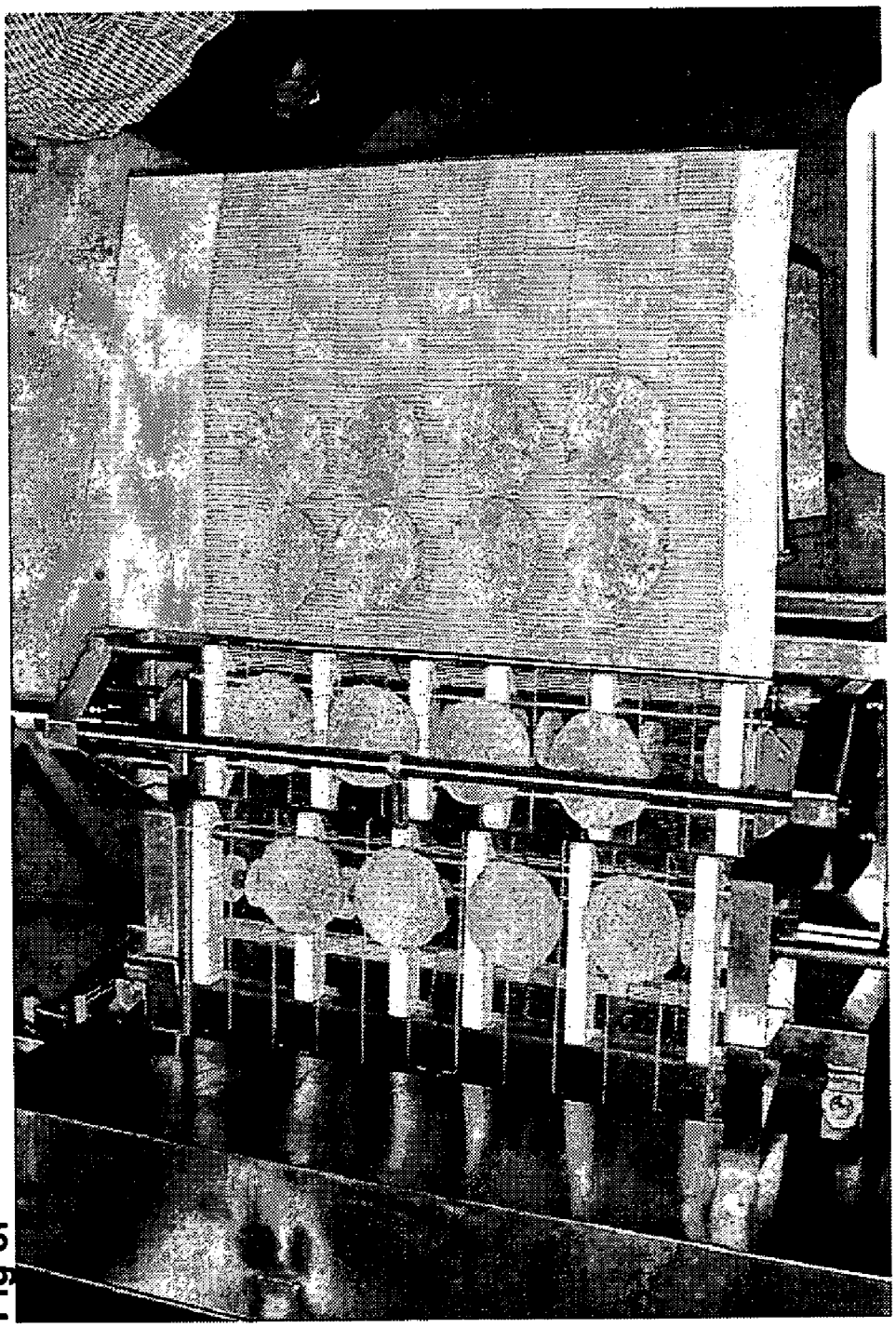
FIG. 8f shows a foodstuff processing system of FIG. 8e in a subsequent operation of the sequence of operations.
Figure 8G:
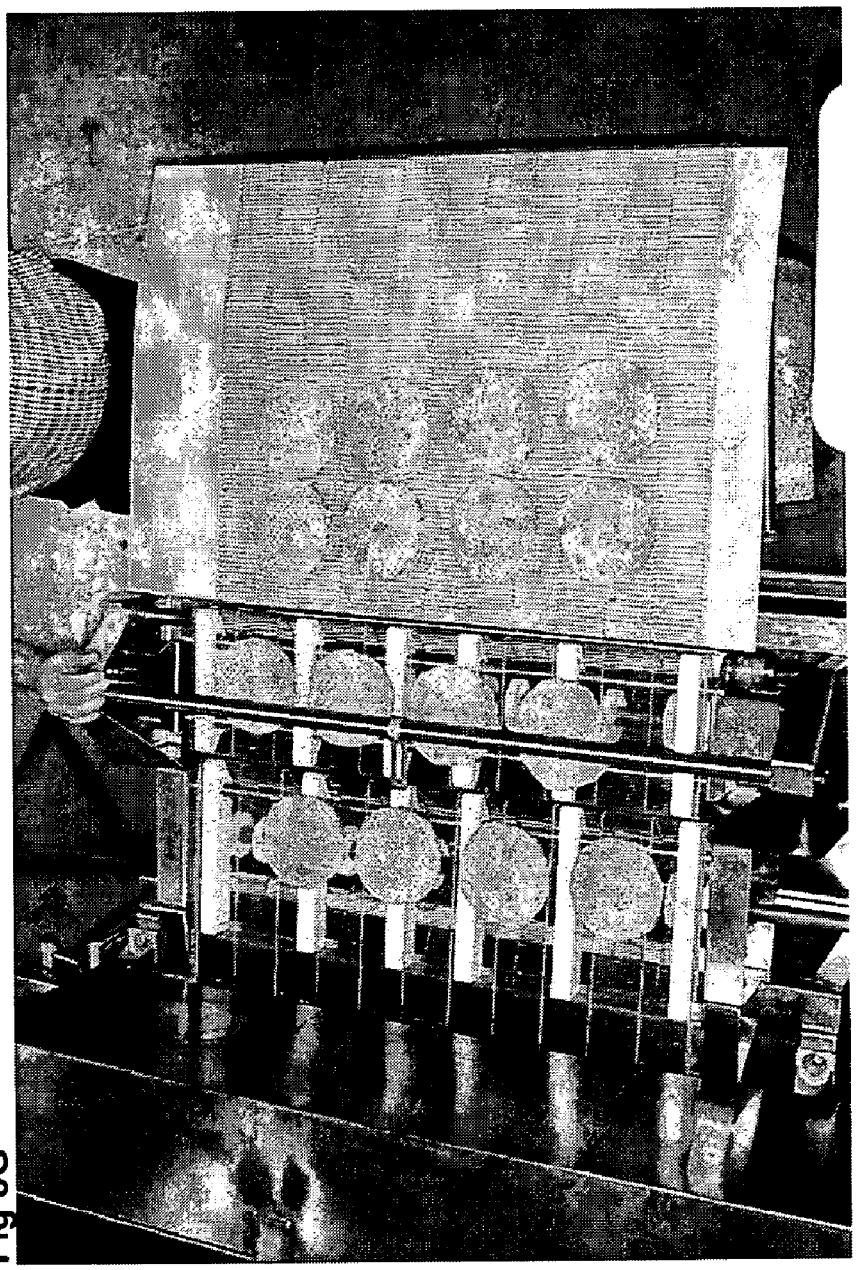
FIG. 8g shows a foodstuff processing system of FIG. 8f in a subsequent operation of the sequence of operations.
Figure 8H:
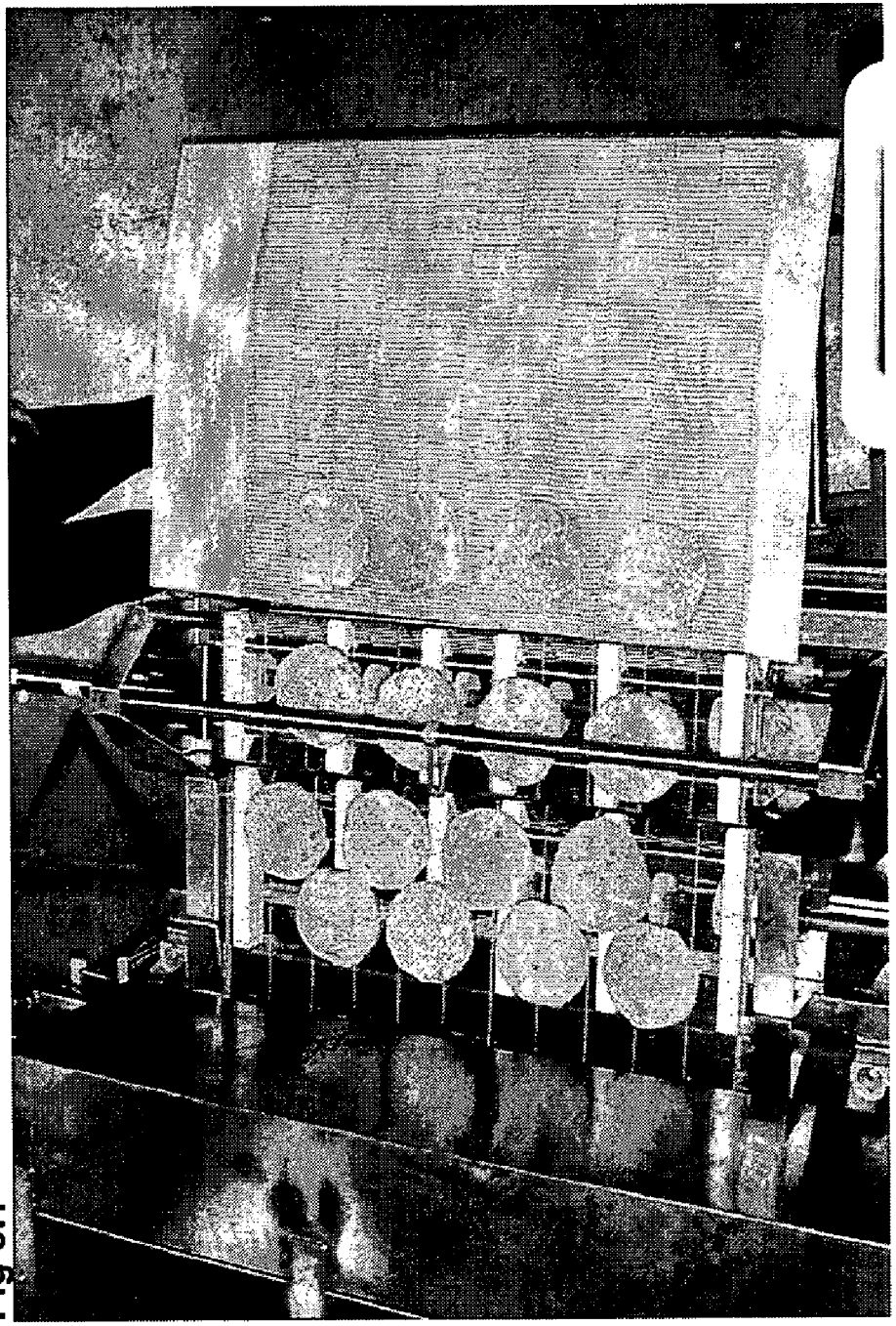
FIG. 8h shows a foodstuff processing system of FIG. 8g in a subsequent operation of the sequence of operations.
Figure 81:
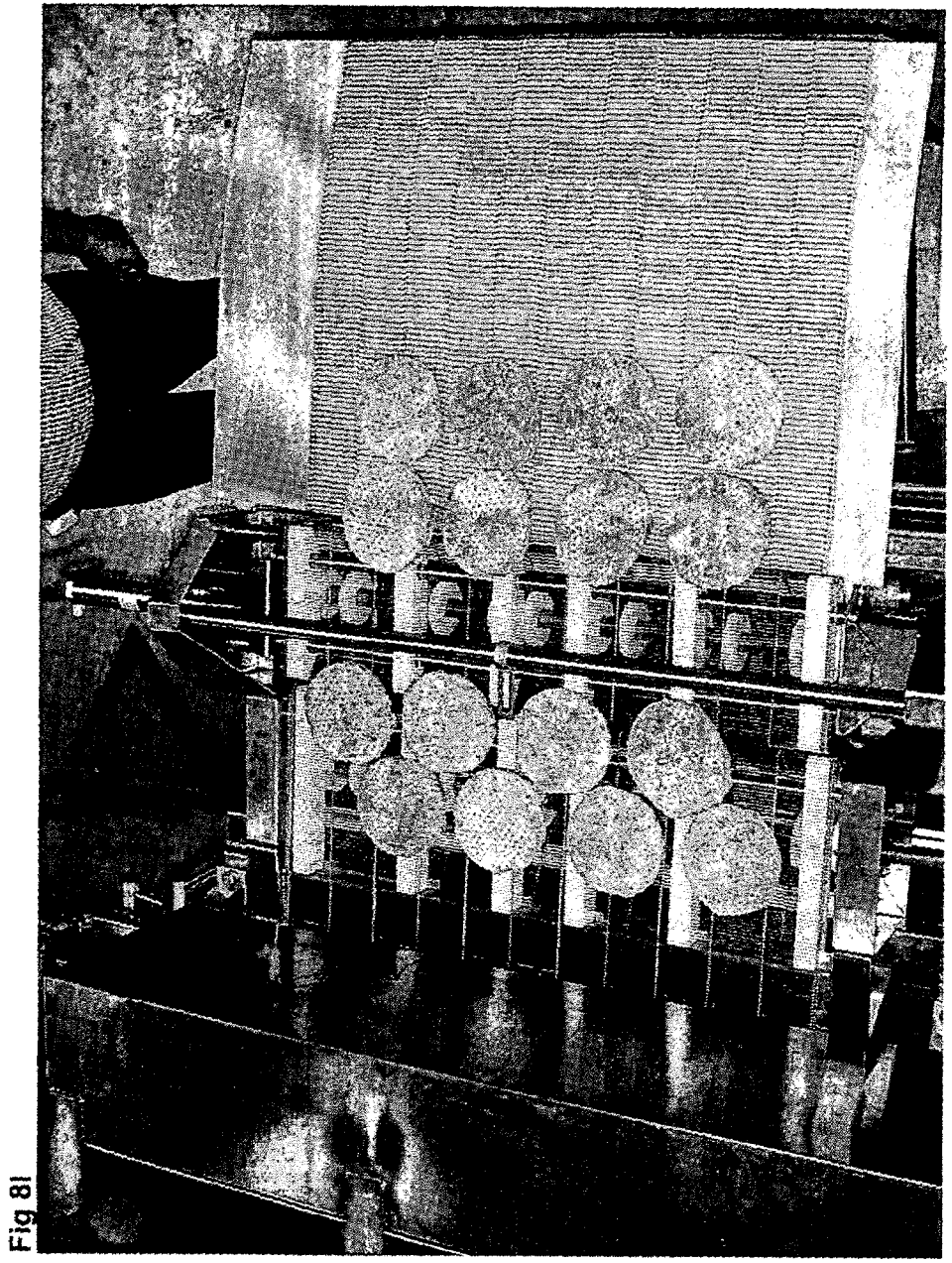
Figure 8J:
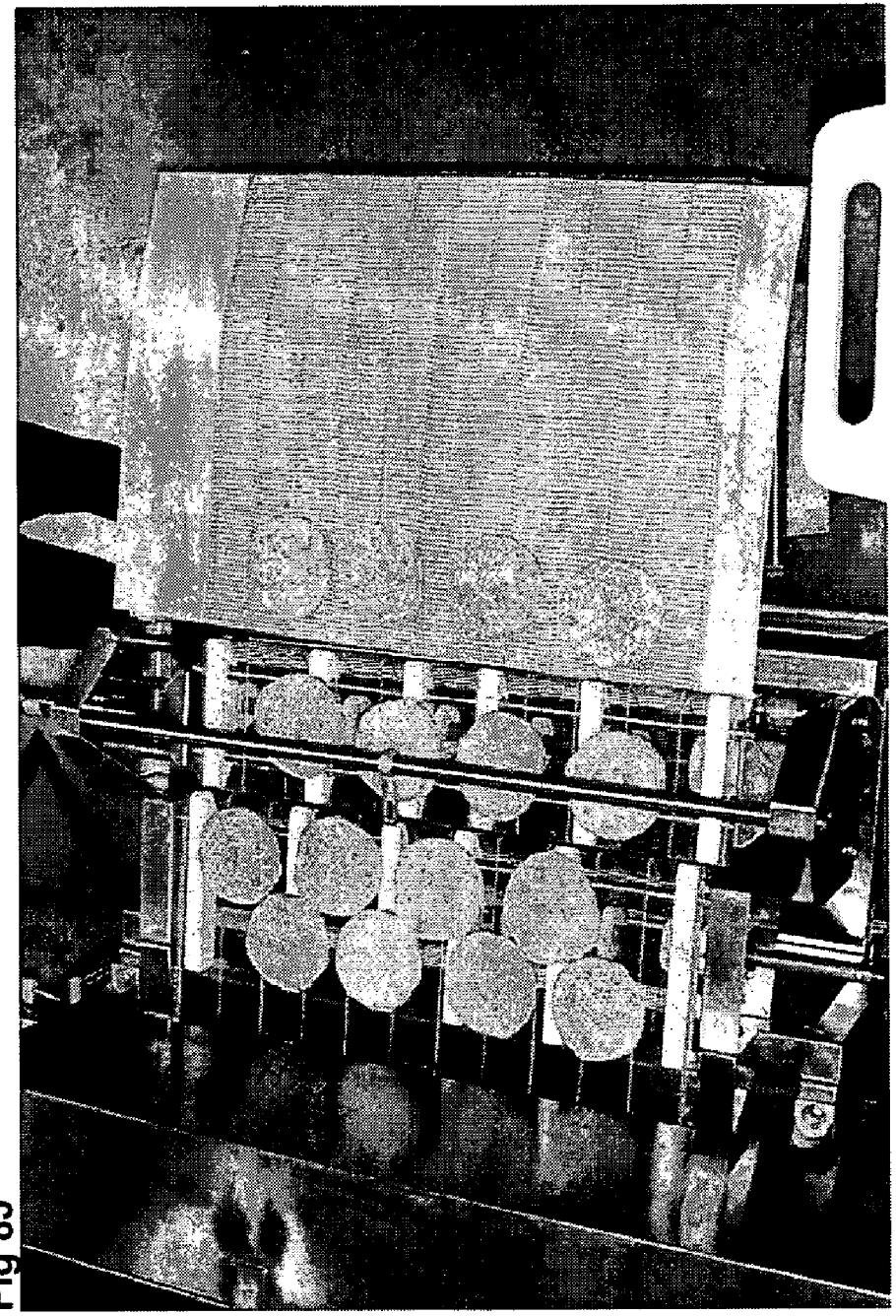
FIG. 8j shows a foodstuff processing system of FIG. 8i in a subsequent operation of the sequence of operations.
Figure 8K:
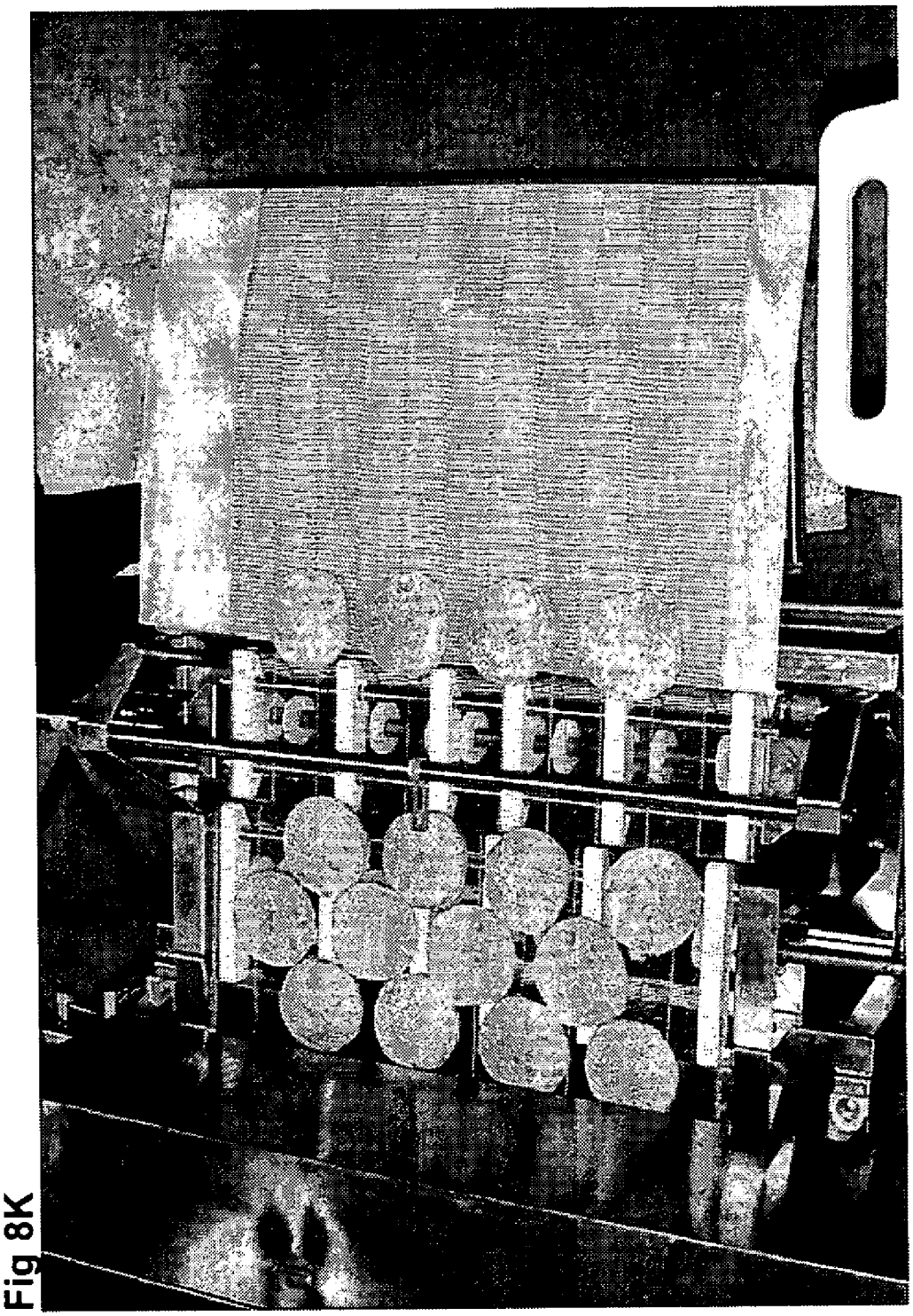
FIG. 8k shows a foodstuff processing system of FIG. 8j in a subsequent operation of the sequence of operations.
Figure 8L:
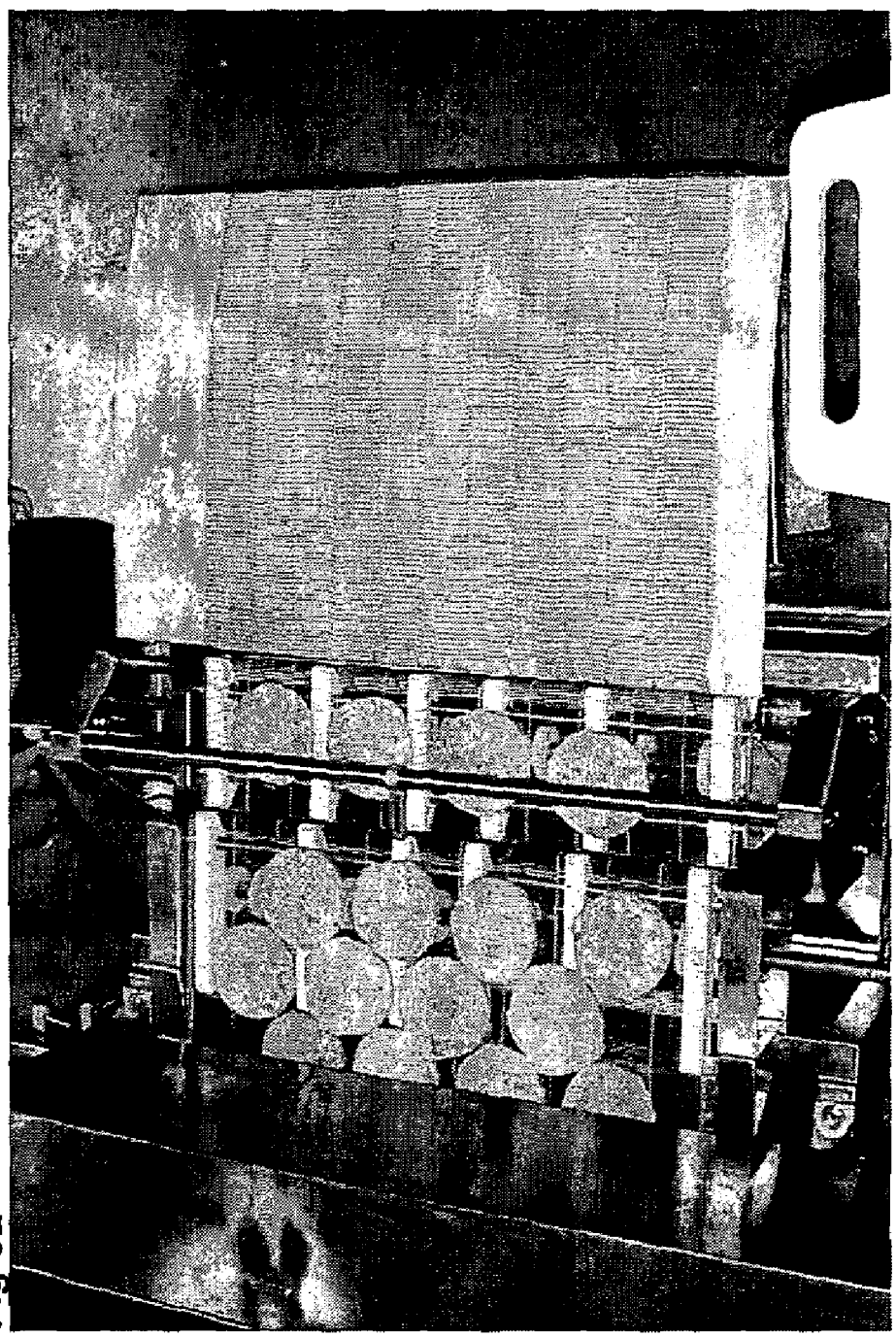
FIG. 8l shows a foodstuff processing system of FIG. 8k in a subsequent operation of the sequence of operations.
Figure 8M:
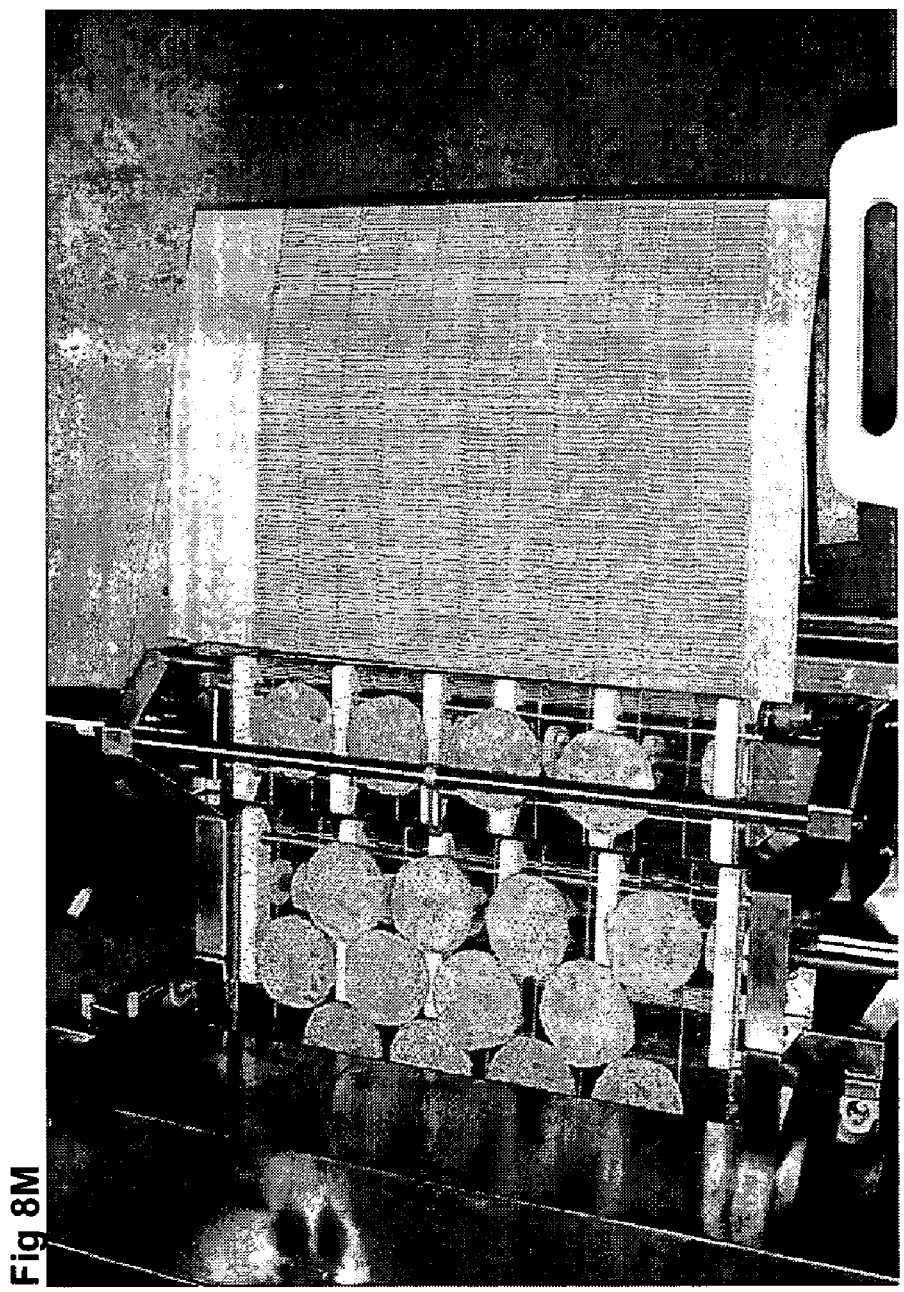
FIG. 8m shows a foodstuff processing system of FIG. 8l in a subsequent operation of the sequence of operations.
Figure 8N:
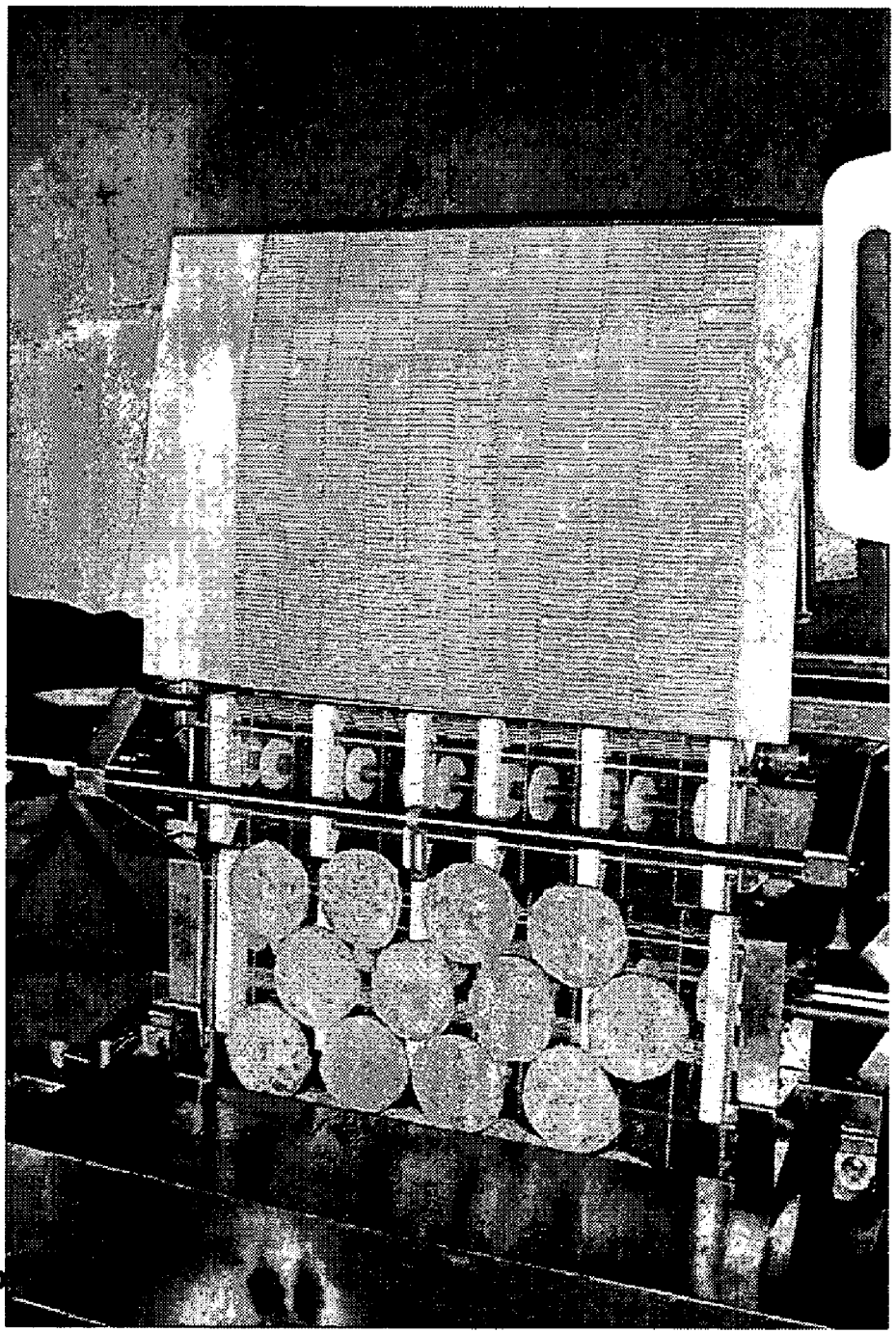
FIG. 8n shows a foodstuff processing system of FIG. 8m in a subsequent operation of the sequence of operations.

Preferably, the axial spacing apparatus 61 is placed between the lateral conveyance apparatus 21 and the upstream apparatus 5, as shown in FIGS. 8a–n. Nesting of foodstuff 15, as shown in FIG. 4, arrangement "c," will result if transport surface 63 is operated at a predetermined lower speed relative to the output speed of foodstuff items on an adjacent upstream apparatus. Also, the axial spacing apparatus 61 may be integrated into any of the following: the lateral conveyance apparatus 21, the upstream apparatus 3 or the downstream apparatus 5, so that the transport surface of any such apparatus is controlled to run at a lower speed (or incrementally at set intervals) than an adjacent upstream apparatus, resulting in axial compaction of foodstuff on the downstream apparatus.

For illustrative purposes, the upstream apparatus 3 may be operating at a feed rate of about 20 feet per minute. The lateral shift apparatus 21mechanism may be operating the transport surface 23 at a feed rate of about 40 feet per minute, for example. Then, by setting the transport surface 63 feed rate at about 20 feet per minute, axial compaction will result. The nesting occurs when the lateral shift mechanism 21 shifts a single row of foodstuff so that it is offset from the previous row of foodstuff and when there is a speed differential between the upstream lateral shift mechanism 21 and the downstream axial spacing apparatus 61.

The axial spacing apparatus 61 may be a continuous loop conveyor system that operates at a selectable speed, controlled by a motor assembly, for example a Sumitomo brand gear motor, model number RNYMS01-1220YCAV40 available from Los Angeles Rubber Company and Drive Systems, Incorporated.

Other axial spacing apparatuses are contemplated. For example, the transport surface 63 may be a mesh continuous loop conveyor, a gravity slide, a chain-roller conveyor, live roller conveyor, cleated loop conveyor, gravity roller, or a solid-surface loop conveyor.

Additionally, the axial spacing apparatus 61 may incorporate a signal generated by a sensing device 33 or controller 51. The signal may be used to control the rate of speed the transport surface 61 operates, or the amount of incline of a gravity slide, for example.

System

Systems for compacting arrangements of foodstuff are shown in FIGS. 3 & 8a–n. The system of FIGS. 8a–n is a preferred system for compacting items of foodstuff into a nested arrangement as illustrated in FIGS. 8a–n. In those figures, the lateral conveyance apparatus 21 is situated between two machines, an upstream apparatus 3 and a downstream apparatus 5. An optional axial spacing apparatus 61 is included in a system, downstream and adjacent to the lateral conveyance apparatus 21. Apparatus 61 helps transition foodstuff items 15 from the lateral conveyance apparatus to the lower speed surface of food processing apparatus 5. The transport surface 63 may be designed so that there is some initial slidability of the foodstuff over the transport surface 63 as the items are transferred. Otherwise, the transfer from an adjacent transport surface with a higher speed may result in bunching of the items at the front end of the surface or otherwise damage the foodstuff, particularly in the case of foodstuff that is sticky or clingy, such as meat patties.

Alternatively, the axial spacing apparatus 63 may be omitted in favor of a direct transfer onto the transport surface of food processing apparatus 5, in which case the transport surface may be designed so that there is slidability of the foodstuff items 15 over the transport surface as the items are transferred. Otherwise, as noted, the transfer from an adjacent transport surface with a higher speed may result in bunching of the items at the front end of the surface.

As shown in FIG. 8, a preferred placement of the axial spacing apparatus 61 is adjacent to the lateral shift mechanism 21 and the downstream apparatus 5. As shown in FIG. 3, the axial spacing apparatus 61 may also be placed between the upstream apparatus 3 and the lateral shift mechanism 21.

The upstream apparatus 3 may be a food presenting machine that presents a set of foodstuff 15 to the lateral conveyance apparatus 21 that includes lateral shift mechanism 21. For example, the foodstuff could be processed or unprocessed, cooked or uncooked food items. One contemplated foodstuff is food patties, such as hamburger, chicken, fish, vegetable and the like. However, any number of other foodstuffs may also be handled by the present invention, such as frozen food items, fried food items, broiled food items, or other processed food items. One contemplated upstream apparatus 3 may be a patty forming system such as Model F-26 available from Formax USA of Mokena, Ill., USA. Another upstream apparatus may be a servo shuttle transfer system such as Model STS available from Formax USA of Mokena, Ill., USA.

The upstream apparatus 3 may be arranged to present a row of foodstuff on a transport surface 9. The transport surface may be disposed to present the row of foodstuff 15 to the lateral conveyance apparatus 21. In turn, the apparatus 21 presents the foodstuff to the axial spacing apparatus 61 and subsequently, a downstream apparatus 5. The upstream apparatus 3 may omit a transport surface and instead dispense items directly onto an adjacent transport surface, such as transport surface 23. For example, items could be dispensed from a row of food extruders that extrude items of foodstuff at set intervals.

The axial spacing apparatus 61 may be placed after the lateral shift mechanism 21 to arrange foodstuff in a nested formation. By controlling the feed rate of the transport surface 63 at a speed that is lower than the speed of the transport surface 23 compaction of foodstuff will result. Because the lateral shift mechanism 21 offsets a row of foodstuff in relation to a previous row, the resulting formation of foodstuff after passing through both the lateral shift mechanism 21 and the axial arranging apparatus 61 results in nested foodstuff as shown in FIG. 4, arrangement "c."

The downstream apparatus 5 would typically perform some operation on the foodstuff, for example cooking, treating, cooling, freezing, or packaging. One contemplated downstream apparatus 5 is a cooking oven, such as a broiler oven, frying oven, or branding oven, all available from Cook King, Inc. of La Miranda, Calif., USA. One suitable downstream apparatus is the cooking oven described in the aforementioned U.S. Pat. No. 5,560,952.

While three or four individual apparatuses are illustrated herein, it is understood that the apparatus 21 with lateral shift mechanism 21 may be integrated into one or all of the associated apparatuses 3 or 5 or 61. For example, illustrated in FIG. 6, the lateral shift apparatus 21 may be integrated into the upstream apparatus 3. This combined apparatus could present foodstuff to a downstream apparatus in various arrangements. For example, axially compact rows such as shown in FIG. 4, arrangement "b", or axially compact and laterally offset rows, or nested foodstuff as shown as arrangement "c", may then be presented to a downstream apparatus 5.

Alternatively, as shown in FIG. 7, the lateral shift apparatus 21 may be integrated into the downstream apparatus 5. In this case, the upstream apparatus may present one or more rows of foodstuff. The combined downstream apparatus will receive a first row of foodstuff, then a lateral shift mechanism will adjust the transport surface so that a second row of foodstuff may be arranged compactly and offset. The compact and offset arrangement may then undergo a subsequent process on this same combined downstream apparatus. While discussion suggests that a first step may be to arrange items in a compact formation, as shown as arrangement "b" in FIG. 4, followed by an offset step, resulting in arrangement "c," either process could occur first.

Finally, in another embodiment (not shown in the figures), the lateral shift apparatus 21 may be integrated into both the upstream and downstream apparatuses, making one apparatus. Here, a row of foodstuff is presented to an integrated shift mechanism. Compact and offset arrangements of subsequent rows of foodstuff may be arranged by manipulating the lateral placement of the transport surface. This compact and offset arrangement may then be presented to a subsequent operation.

Similarly, the axial spacing apparatus 61 may be integrated into any apparatus 3, 5 or 21. For example, a motor assembly may be adapted to move a transport surface 63 at a speed that is independent of the rate of the transport surface 9 from the upstream apparatus. This transport surface 63 may be coupled to the upstream apparatus 3, or to the lateral shift mechanism 21. Alternatively, the axial spacing apparatus 61 may be integrated with the lateral shift mechanism and may include two separate transport surfaces, or one transport surface capable of both lateral adjustment and speed control. Finally, the speed control mechanism 61 may be integrated into the downstream apparatus 5. It will be appreciated that any one of these configurations, in combination with a lateral shift mechanism 21 would result in a compact arrangement of foodstuff, as shown in FIG. 4, and as contemplated by the present invention.

One contemplated embodiment of the present invention may be a combination apparatus that incorporates both the lateral shift mechanism and the axial spacing apparatus. Further, this combination apparatus may also be incorporated in the upstream apparatus, for example. In this example, the upstream apparatus may present a first row of foodstuff as depicted in FIG. 4, arrangement "a." Then, a combination lateral shift mechanism and axial spacing apparatus could incrementally and cooperatively advance a certain distance both in the direction of travel and along a lateral axis so that a second row of foodstuff dispensed by the upstream apparatus would have a compact relationship of foodstuff, as depicted in FIG. 4, arrangement "c".

In view of the foregoing, persons skilled in the art will appreciate from the teachings herein that the operation of the transport surfaces 23 and 63, for example, may be continuous or incremental so that axial and/or laterally offset arrangements may be achieved in various implementations of the features and functions of the present invention.

Method of Operation of the Present Invention

The operation of the foregoing system is illustrated in FIGS. 8a–n.

FIGS. 8a–b show a foodstuff processing system in an initial operation of a sequence of operations. Several rows of items of foodstuff, in this case hamburger patties, are disposed on an upstream transport surface 9 (mock-up shown), representing a moving conveyor of wire mesh, moving at about 15–25 ft/min. As the conveyor advances, a row of patties is advanced onto transport surface 23 (FIG. 8b), which is also a wire mesh conveyor moving at about 30–40 ft/min. As the row advances on transport surface 23, a sensor detects the row (FIG. 8c) and signals a lateral shift mechanism to shift the transport surface 22 to the left (FIG. 8d). The first row of patties is advanced from transport surface 63 to the transport surface 7 of a downstream, adjacent food processing apparatus 5 (FIG. 8e), in this case an elongated cooking oven. This downstream transport surface may be moving at about 15–25 ft/min. At the same time, the next row of patties from transport surface 9 is advanced onto transport surface 23 (FIG. 8e). As the second row advances on transport surface 23, the sensor is again activated (FIG. 8f) and the transport surface is shifted to the right (FIG. 8g). The shifting of the second row places the two rows of patties in offset alignment, nesting the second row against the first row (FIG. 8h–i). The foregoing steps are repeated to advance additional rows into a nested arrangement on the transport surface of oven 5 (FIGS. 8j–n). The spacing between rows of foodstuff may vary according to a particular application. Accordingly, a given row of patties, for example, may contact an adjacent row. Optionally, there may be visible spacing between adjacent rows of foodstuff.

Persons skilled in the art will recognize that many modifications and variations are possible in the details, materials, and arrangements of the parts and actions which have been described and illustrated in order to explain the nature of this invention and that such modifications and variations do not depart from the spirit and scope of the teachings and claims contained therein.

What is claimed is:

1. A system for adjustable placement of foodstuff, comprising:
    a pair of adjacent transport surfaces that meet at an interface wherein one of the pair of transport surfaces is adapted to present rows of foodstuff items, wherein the rows may contain various numbers of foodstuff items, wherein each of the pair of surfaces is configured to transfer an undefined number of foodstuff items in each row across the interface so that the foodstuff items are transferred from one of the transport surfaces in a first arrangement to the other of said transport surfaces in a second laterally shifted and axially more compact arrangement, and
    the system being capable of delivering the rows of foodstuff items to a downstream food processing apparatus in a nested arrangement.

2. A system for the adjustable placement of foodstuff, the system comprising:
    an upstream apparatus for presenting plural sets of foodstuff items with each set arranged in rows, wherein each row may contain various numbers at foodstuff items,
    a transport surface located adjacent the upstream apparatus that receives the foodstuff items from the apparatus across an interface between the upstream apparatus and the transport surface, wherein the upstream apparatus and the transport surface are configured to transfer an undefined number of foodstuff items in each row across the interface;
    a lateral shift mechanism mechanically linked to the transport surface for selectively laterally adjusting the transport surface within a predetermined range so that one set of foodstuff items presented by the upstream apparatus is offset from an adjacent set of foodstuff items; and
    a downstream apparatus for processing foodstuff items, the downstream apparatus having a downstream apparatus transport surface for receiving the plural sets of foodstuff from said transport surface.

3. The system of claim 2 further including a means associated with the laterally adjustable conveyor for sensing the location of the foodstuff items on the transport surface.

4. The system of claim 2 wherein the upstream apparatus comprises an axial spacing apparatus.

5. The system of claim 2 wherein the downstream apparatus comprises an oven with a transport surface running therethrough.

6. The system of claim 2 wherein the downstream apparatus comprises an axial spacing apparatus.

* * * * *